(12) United States Patent
Svihla et al.

(10) Patent No.: US 11,781,489 B2
(45) Date of Patent: Oct. 10, 2023

(54) GEAR TRAIN JOINT (71) Applicant: Progress Rail Locomotive Inc., LaGrange, IL (US)

(72) Inventors: Gary R. Svihla, Burr Ridge, IL (US); John M Carr, Chicago, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 27 days.

(21) Appl. No.: 17/524,552

(22) Filed: Nov. 11, 2021

(65) Prior Publication Data

US 2023/0143633 A1 May 11, 2023

(51) Int. Cl.
*F02B 39/04* (2006.01)
*F16C 35/067* (2006.01)
*F16H 1/28* (2006.01)
*F16H 57/08* (2006.01)
*F02C 7/36* (2006.01)

(52) U.S. Cl.
CPC .............. *F02C 7/36* (2013.01); *F02B 39/04* (2013.01); *F16C 35/067* (2013.01); *F16H 1/28* (2013.01); *F16H 57/082* (2013.01); *F05D 2220/40* (2013.01); *F05D 2240/50* (2013.01); *F05D 2240/60* (2013.01); *F05D 2260/40311* (2013.01); *F16C 2226/12* (2013.01); *F16C 2360/24* (2013.01); *F16H 2057/085* (2013.01)

(58) Field of Classification Search
CPC .......... F02C 7/36; F02B 39/04; F16C 35/067; F16C 2226/12; F16C 2360/24; F16H 1/28; F16H 57/082; F16H 2057/085; F05D 2220/40; F05D 2240/50; F05D 2240/60; F05D 2260/40311
See application file for complete search history.

(56) References Cited

U.S. PATENT DOCUMENTS

| | | | |
|---|---|---|---|
| 4,721,441 A | 1/1988 | Miyashita et al. | |
| 6,032,466 A | 3/2000 | Woollenweber et al. | |
| 6,364,634 B1 | 4/2002 | Svihla et al. | |
| 6,499,884 B1 * | 12/2002 | Svihla | F16C 17/10 384/138 |
| 6,499,969 B1 | 12/2002 | Tombers et al. | |
| 6,896,479 B2 | 5/2005 | Svihla et al. | |
| 6,994,531 B2 * | 2/2006 | Dairokuno | F04D 25/028 123/565 |
| 7,108,488 B2 | 9/2006 | Larue et al. | |

(Continued)

FOREIGN PATENT DOCUMENTS

| | | |
|---|---|---|
| CH | 712614 B1 | 11/2020 |
| CN | 205841303 U | 12/2016 |

(Continued)

OTHER PUBLICATIONS

Written Opinion and International Search Report for Int'l. Patent Appln. No. PCT/US2022/049085, dated Mar. 16, 2023 (11 pgs).

*Primary Examiner* — J. Todd Newton (57) ABSTRACT

A bearing support for a turbocharger, the bearing support including a body, a bore extending axially through the body and dimensioned to receive a bearing and a portion of a planet carrier, and a plurality of pilots. Each pilot may be formed on an external surface of the body, and each pilot may be machined for an interference fit with a different component of the turbocharger.

20 Claims, 6 Drawing Sheets

(56) References Cited

U.S. PATENT DOCUMENTS

| | | |
|---|---|---|
| 7,371,047 B2 | 5/2008 | Burmester et al. |
| 8,128,865 B2 | 3/2012 | Jahnz et al. |
| 8,820,072 B2 | 9/2014 | Figura et al. |
| 8,858,156 B2 | 10/2014 | Swenson et al. |
| 9,127,690 B2 | 9/2015 | Knaack |
| 9,181,855 B2 | 11/2015 | Svihla et al. |
| 9,200,567 B2 | 12/2015 | Parker et al. |
| 9,279,343 B2 | 3/2016 | Knaack |
| 9,470,240 B2 | 10/2016 | Uneura |
| 9,482,240 B2 | 11/2016 | Gerard et al. |
| 9,546,563 B2 | 1/2017 | Panambur et al. |
| 9,726,020 B2 | 8/2017 | Loewenberg |
| 9,835,164 B2 | 12/2017 | Svihla et al. |
| 9,874,099 B2 | 1/2018 | Rexavier et al. |
| 9,915,172 B2 | 3/2018 | Annati et al. |
| 10,018,205 B2 | 7/2018 | Pinkney et al. |
| 10,119,417 B2 | 11/2018 | Bucking |
| 10,161,265 B2 * | 12/2018 | Isayama ................ F04D 29/051 |
| 10,436,211 B2 | 10/2019 | McArdle et al. |
| 10,677,099 B2 | 6/2020 | Hossbach |
| 2010/0143111 A1 | 6/2010 | Kuehnel |
| 2010/0215506 A1 | 8/2010 | Heyes et al. |
| 2012/0165151 A1 * | 6/2012 | Sherrill ............... F02D 41/0007 475/183 |
| 2015/0184586 A1 * | 7/2015 | Tanaka .................... F02B 39/04 123/559.1 |
| 2016/0097302 A1 | 4/2016 | Svihla et al. |
| 2016/0177960 A1 | 6/2016 | Svihla et al. |
| 2016/0177965 A1 | 6/2016 | Svihla et al. |
| 2016/0208684 A1 | 7/2016 | Naruoka et al. |
| 2016/0265382 A1 | 9/2016 | Annati et al. |
| 2017/0002828 A1 | 1/2017 | Rexavier et al. |
| 2018/0328373 A1 | 11/2018 | Aynacioglu et al. |
| 2020/0182137 A1 | 6/2020 | Carr et al. |
| 2021/0156304 A1 | 5/2021 | Kobielski et al. |

FOREIGN PATENT DOCUMENTS

| | | |
|---|---|---|
| CN | 207728444 U | 8/2018 |
| DE | 102015216319 A1 | 3/2017 |
| EP | 2865897 B1 | 4/2016 |
| EP | 3081769 | 10/2016 |
| EP | 3128152 | 2/2017 |
| JP | 3587350 B2 | 11/2004 |
| JP | 5598433 B2 | 10/2014 |

* cited by examiner

GEAR TRAIN JOINT

TECHNICAL FIELD

The present disclosure relates generally to turbochargers and, more particularly, to turbochargers with a gear train joint.

BACKGROUND

Internal combustion engines, for example, diesel engines, gasoline engines, or natural gas engines, employ turbochargers to deliver compressed air to combustion chambers within the engine. An increased supply of air enables increased fuel combustion within the combustion chambers of the engine, resulting in increased power output from the engine.

A typical turbocharger rotor includes a shaft extending between a compressor impeller (also referred to as a compressor wheel) and a turbine. Bearings typically support the shaft, and separate housings coupled together enclose the compressor impeller, the turbine, and the bearings. In operation, hot exhaust from the engine flows through the turbine housing and expands over the turbine, rotating the turbine and the shaft, which in turn rotates the compressor impeller. The compressor impeller receives cool air from ambient surroundings and forces compressed air into combustion chambers of the engine. A gear train may also be provided to drive the turbine during, for example, operation at lower speeds and loads, when the engine exhaust energy alone is insufficient to drive the turbine.

Turbocharger rotors driven by epicyclic gear trains require user of complex alignment mechanisms to ensure all mating surfaces run within specification, as any misalignment, for example, can cause damage to individual components and shorten service life. Spur gears, which are typically used to transmit motion and power between parallel shafts, may have offset centerlines, requiring the housings supporting the gears and associated bearings to include apertures in at least one side, which can make it difficult to align the housings via simple pilots. Some solutions require placing a structural bulkhead between drive and output gears, which adds even more to the complexity of aligning the various support structures.

One method of aligning multiple housings, involves locating the pieces relative to one another, machining out the bearing bores and then doweling the pieces together. Such an approach is disclosed in U.S. Pat. No. 10,526,954, in which a turbine housing includes dowels for attachment of an insert and to achieve a desired axial alignment with respect to the insert. While this general approach may achieve a desired alignment accuracy, it is done so at the expense of complex machining and the requirement for matched or paired assemblies. There is consequently a need for an improved gear train joint.

SUMMARY

In accordance with one aspect of the present disclosure, a bearing support for a turbocharger is disclosed. The bearing support may include a body, a bore, and a plurality of pilots. The bore may extend axially through the body and may be dimensioned to receive a bearing and a portion of a planet carrier. Each pilot may be formed on an external surface of the body, and each pilot may be machined for an interference fit with a different component of the turbocharger.

In accordance with another aspect of the present disclosure, a gear train assembly for a turbocharger is disclosed. The gear train assembly may include a drive shaft, a plurality of planetary gears, a planet carrier, a gear support and a bearing support. The drive shaft may be coupled to a turbine wheel and a sun gear. The planet carrier may extend from a center axis of the plurality of planetary gears through a primary bearing. The gear support may be coupled to a housing of the turbine wheel. In addition, the bearing support may include a body, a bore, and a plurality of pilots. The bore may extend axially through the body and may be dimensioned to receive the primary bearing and a portion of the planet carrier. Each pilot may be formed on an external surface of the body, and may be machined for interference fit with a different component of the turbocharger.

In accordance with yet another aspect of the present disclosure, a turbocharger is disclosed. The turbocharger may include a turbine wheel housed in a turbine housing having an end wall, a compressor impeller housed in a compressor housing, and a shaft extending between the turbine wheel and the compressor impeller. The turbine wheel and the compressor impeller may be mounted on the shaft for rotation together, and a gear train may be driven by an engine. The gear train may include a drive shaft couple to the turbine wheel, a plurality of planetary gears, a planet carrier configured to couple the plurality of planetary gears together; and a bearing support. The bearing support may include a body, a bore and four pilots. The bore may extend axially through the body and be dimensioned to receive the primary bearing and a portion of the planet carrier. Each pilot may be configured to form an interference fit between an external surface of the bearing support and a surface of a corresponding component of the turbocharger.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
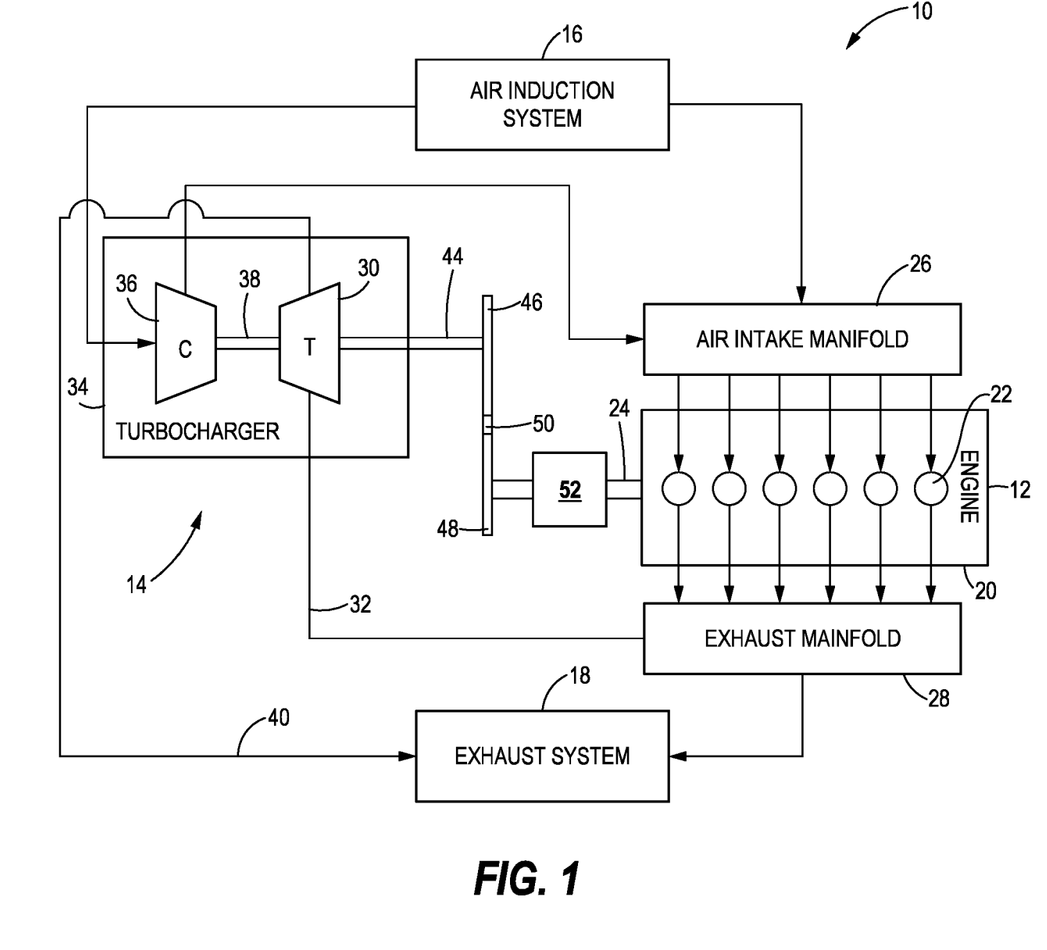
FIG. 1 is a schematic illustration of an engine system including a turbocharger, in accordance with an embodiment of the present disclosure.

Referring now to FIG. 1, an exemplary power system 10 is illustrated schematically. The power system 10 includes an internal combustion engine 12, an integrated turbocharger 14, an air induction system 16, and an exhaust system 18. For the purposes of this disclosure, the engine 12 may be a two-stroke diesel engine, although one skilled in the art will recognize that the engine may be any other type of internal combustion engine such as, for example, a four-stroke diesel engine or a two- or four-stroke gasoline or gaseous fuel-powered engine. Further, the engine 12 may find applications in mobile machines (not shown) such as, but not limited to, locomotives, vehicles, heavy mechanical equipment, large tractors, on-road vehicles, off-road vehicles, marine vessels and the like, as well as in stationary machines (not shown) such as generator sets and pumps.

The engine 12 may include an engine block 20 that at least partially defines a plurality of cylinders 22. A piston (not shown) may be slidably disposed within each cylinder 22 to reciprocate between a top-dead-center position and a bottom-dead-center position, and a cylinder head (not shown) may be associated with each cylinder. Each cylinder 22, piston, and cylinder head may, together, at least partially define a combustion chamber. In the embodiment illustrated in FIG. 1, the engine 12 includes six cylinders 22 arranged in an inline configuration. However, it is contemplated that the engine 12 may include a greater or lesser number of cylinders 22, and that the cylinders may be arranged in a V-configuration (i.e., a configuration having first and second banks or rows of cylinders), an opposing-piston configuration, or another configuration as will be apparent to those skilled in the art. Combustion of a fuel and air mixture in each cylinder 22 generates motive power that rotates an engine output shaft 24, and a resultant exhaust gas is produced, as is known in the art.

The engine 12 may further include an air intake manifold 26 and an exhaust manifold 28 that are selectively in fluid communication with each compression cylinder 22. The air intake manifold 26 may provide compressed intake air to the compression cylinders 22 from the air induction system 16, which draws air from the ambient atmosphere surrounding the engine 12 and any machine in which the engine is installed. Compressed air from the air intake manifold 26, along with fuel from a fuel tank (not shown), forms a combustible mixture that ignites when compressed, such as in each cylinder 22, or in the presence of a spark, for example. Combustion byproducts are evacuated from each cylinder 22 through the exhaust manifold 28, to one of the exhaust system 18 and the turbocharger 14. At least a portion of the exhaust gases may be transmitted to the exhaust system 18 for after-treatment prior to being released back into the atmosphere.

Another portion of the exhaust gases may be transmitted to the turbocharger 14, and, more specifically, to a turbine wheel 30 via a high pressure exhaust gas line 32, for example. A turbocharger housing 34 may be configured to direct the pressurized exhaust gas toward the turbine wheel 30, which may be mounted opposite a compressor impeller 36 on a shaft 38 within the turbocharger housing. The compressor impeller 36 may be mounted on the shaft 38, and configured for rotation with the shaft and turbine wheel 30. When the temperature and pressure of the exhaust gas from the engine 12 are sufficient, exhaust torque generated by the exhaust gas drives the turbine wheel 30, which causes rotation of the shaft 38 and, ultimately, the compressor impeller 36. The rotating compressor impeller 36 thereby compresses air received from the air induction system 16, and outputs compressed air to the air intake manifold 26, where the compressed air is mixed with air provided by the air induction system. After powering the turbine wheel 30, spent exhaust gas is discharged to the exhaust system 18 via, for example, a low pressure exhaust gas return line 40.

During some operating conditions of the engine 12, it may be desirable to drive the turbine wheel 30 of the turbocharger 14 even though a temperature and pressure of the exhaust gas may be insufficient to rotate the turbine wheel at a desired speed. For example, at low engine speeds, such as when the engine 12 is idling, emissions of pollutants such as nitrous oxides (NOx) can increase and low exhaust temperatures can make exhaust after treatment systems in the exhaust system 18 ineffective. In one exemplary embodiment, to selectively provide direct drive to the turbocharger 14 by the engine 12 when the operating conditions dictate, the engine output shaft 24 may drive the shaft 38 when the exhaust gas will not drive the turbine wheel 30, and may be disengaged when the exhaust gas will create sufficient torque and rotate the turbine wheel and the compressor impeller 36 at sufficient speeds so that direct drive by the engine is unnecessary.

For example, in one embodiment, a carrier shaft 44 may be operatively coupled to the turbine wheel 30 and may have a carrier drive gear 46 mounted thereon and rotatable therewith. An operative connection between the engine 12 may be provided by a turbocharger drive gear 48 connected to a gear train or transmission 52 that is driven by the engine output shaft 24. The turbocharger drive gear 48 may be operatively connected to the carrier drive gear 46 by one or more idler gears 50 so that the carrier shaft 44 will spin at a desired speed and direction relative to the engine output shaft 24. In other embodiments, other appropriate drive mechanisms and arrangements may be utilized to drive the turbine wheel 30 and compressor impeller 36.

Figure 2:
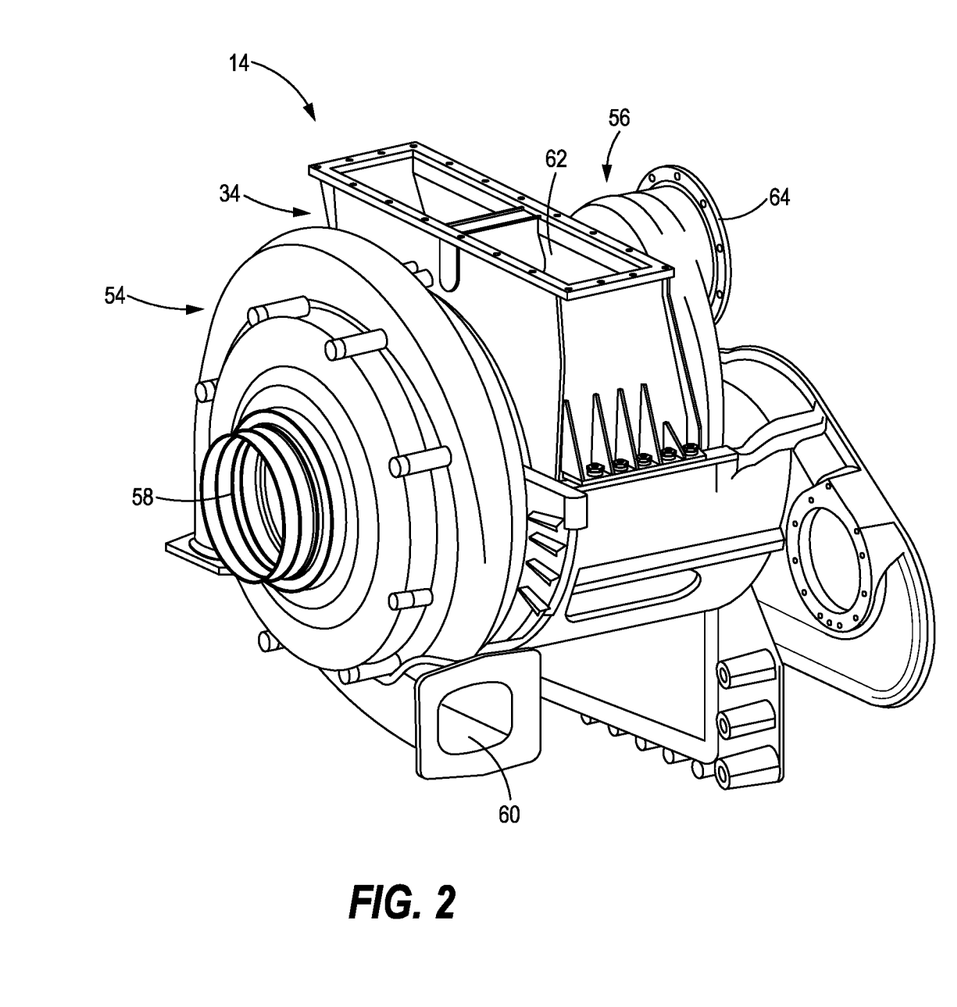
FIG. 2 is a perspective view of the turbocharger of FIG. 1, in accordance with an embodiment of the present disclosure.
Figure 3:
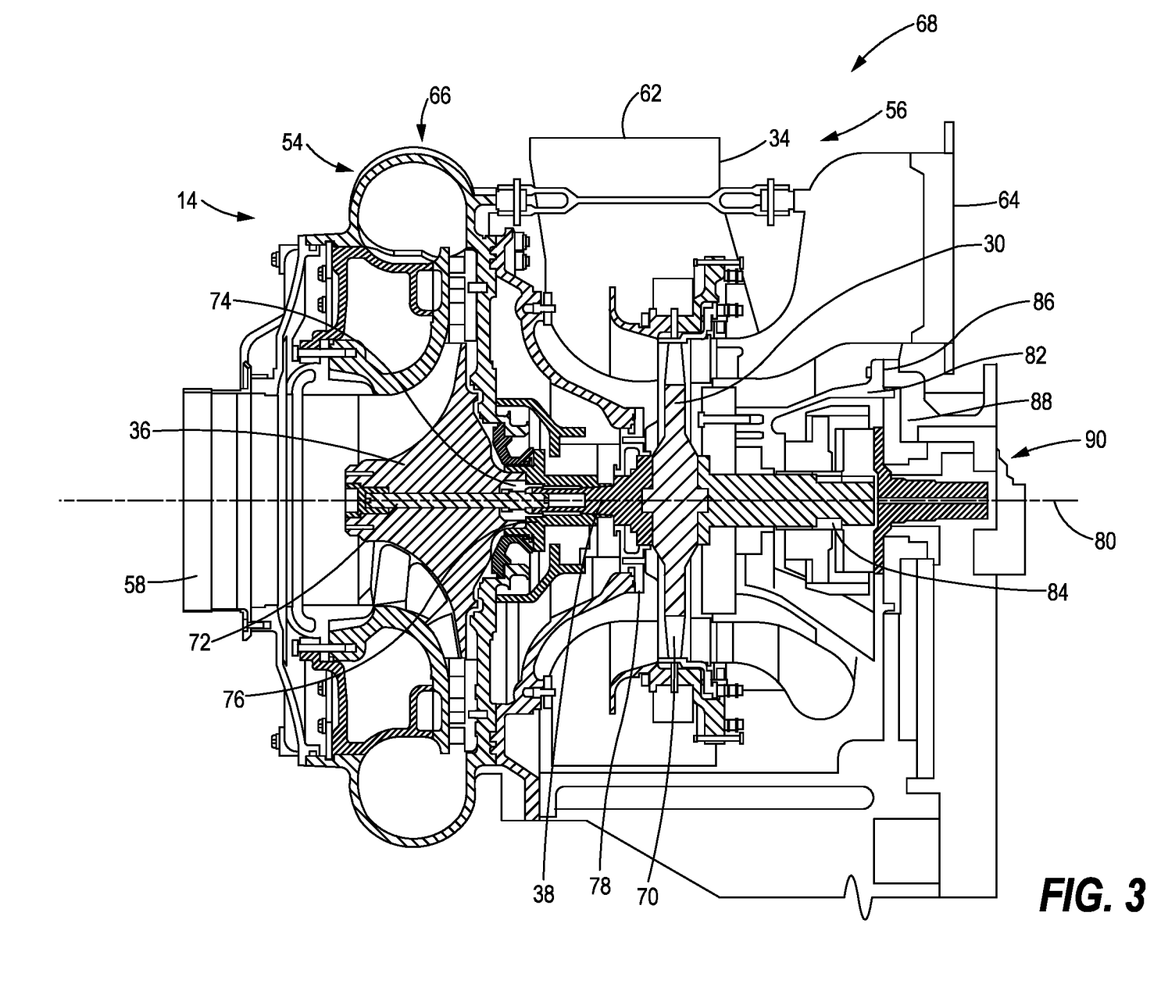
FIG. 3 is a sectional view of the turbocharger of FIG. 2, in accordance with an embodiment of the present disclosure.

Referring now to FIGS. 2-3, with continued reference to FIG. 1, an exemplary embodiment of the turbocharger 14 is illustrated. The turbocharger housing 34 includes both a compressor housing 54 and a turbine housing 56. In operation, air may enter the compressor housing 54 from the air induction system 16 via a compressor inlet 58, and may exit the compressor housing toward the air intake manifold 26 via a compressor outlet 60. Similarly, exhaust gases may enter the turbine housing 56 from the exhaust manifold 28 via a turbine inlet 64, and may exit the turbine housing toward the exhaust system 18 via a turbine exhaust duct 62.

Further, the turbocharger 14 may include at least a compressor stage 66 and a turbine stage 68 disposed within the turbocharger housing 34. The compressor stage 66 may include the compressor impeller assembly including the compressor impeller 36, a stud 72, an insert 74, an impeller cap 76, a thrust washer 78, and the shaft 38, all of which may be disposed around a rotational axis 80. As air moves through the compressor stage 66, the compressor impeller 36 may increase the pressure of the air, which may be directed toward the engine 12. The turbine stage 68 may include the turbine housing 56 and the turbine wheel 30, which may be attached to the shaft 38. As hot exhaust gases move through the turbine housing 56 and expand against blades 70 of the turbine wheel 30, the turbine wheel may rotate, causing the compressor impeller 36 to rotate via the shaft 38 and the stud 72.

The turbocharger 14 may further include a compressor side bearing housing (not shown) and a turbine side bearing housing 82 that may connect the compressor impeller 36 and the turbine wheel 30 to their respective support housings 54, 56. More specifically, the turbine side bearing housing 82 may be a generally cylindrical, multi-stepped component configured to internally support the shaft 38 via bearings 84, and to engage an exterior surface 86 of an end wall 88 at an outer periphery. The turbine side bearing housing 82 may also at least partially house and support a gear train 90. The gear train 90 may facilitate selective operation of the turbocharger 14 in a turbocharging mode of operation (i.e., where the turbine wheel 30 drives the compressor impeller 36 in a conventional manner) where the engine 12 drives the compressor impeller via the turbine wheel. The gear train 90 may be a planetary or epicyclic gear train. A planetary gear train is generally made up of at least three different elements, including a sun gear, a planet carrier having at least one set of planet gears, and a ring gear. The planet gears of the planet carrier mesh with the sun gear and the ring gear. The sun gear, planet carrier and ring gear are driven as an input, while another of the sun gear, planet carrier, and ring gear rotates as an output.

Figure 4:
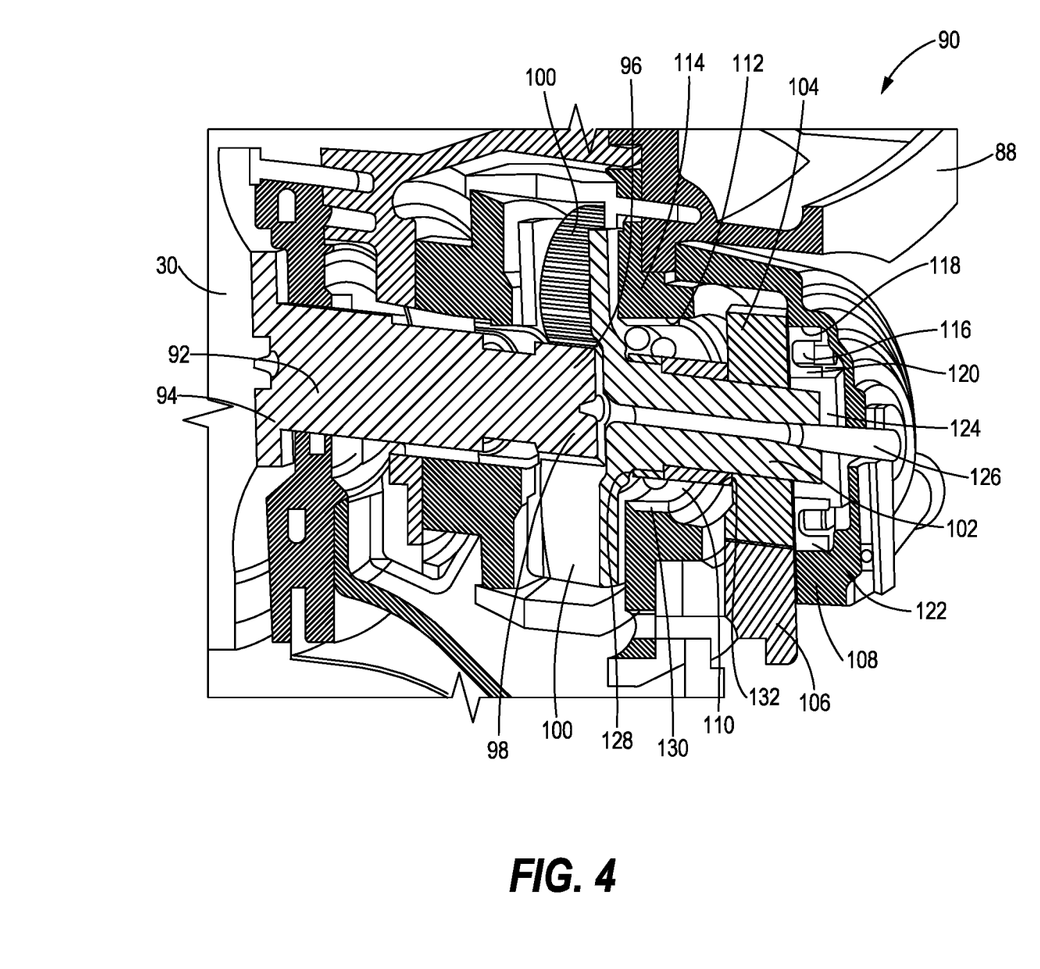
FIG. 4 is a perspective view of a portion of the turbocharger of FIG. 2, in accordance with an embodiment of the present disclosure.
Figure 5:
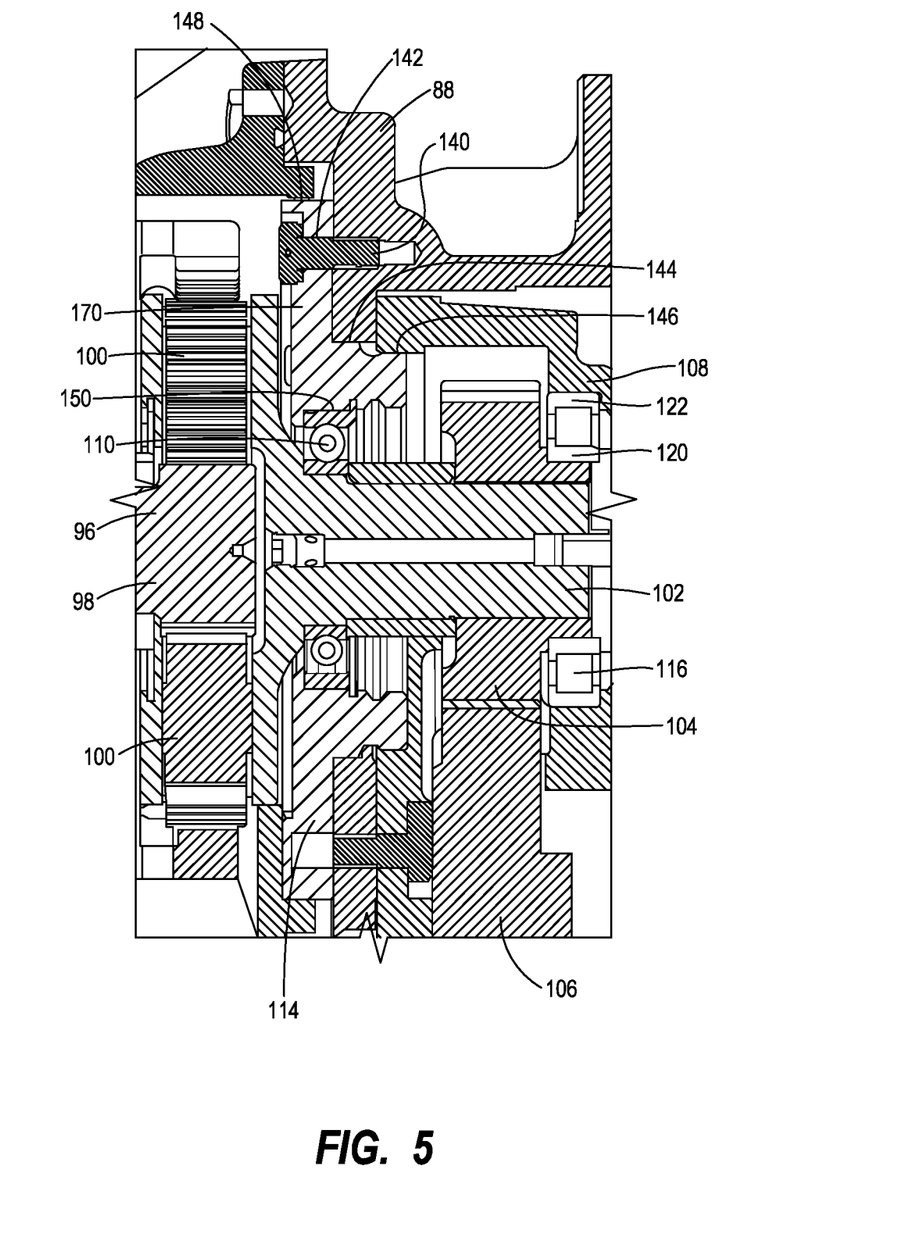
FIG. 5 is a sectional view of a portion of the turbocharger of FIG. 2, in accordance with an embodiment of the present disclosure.
Figure 6:
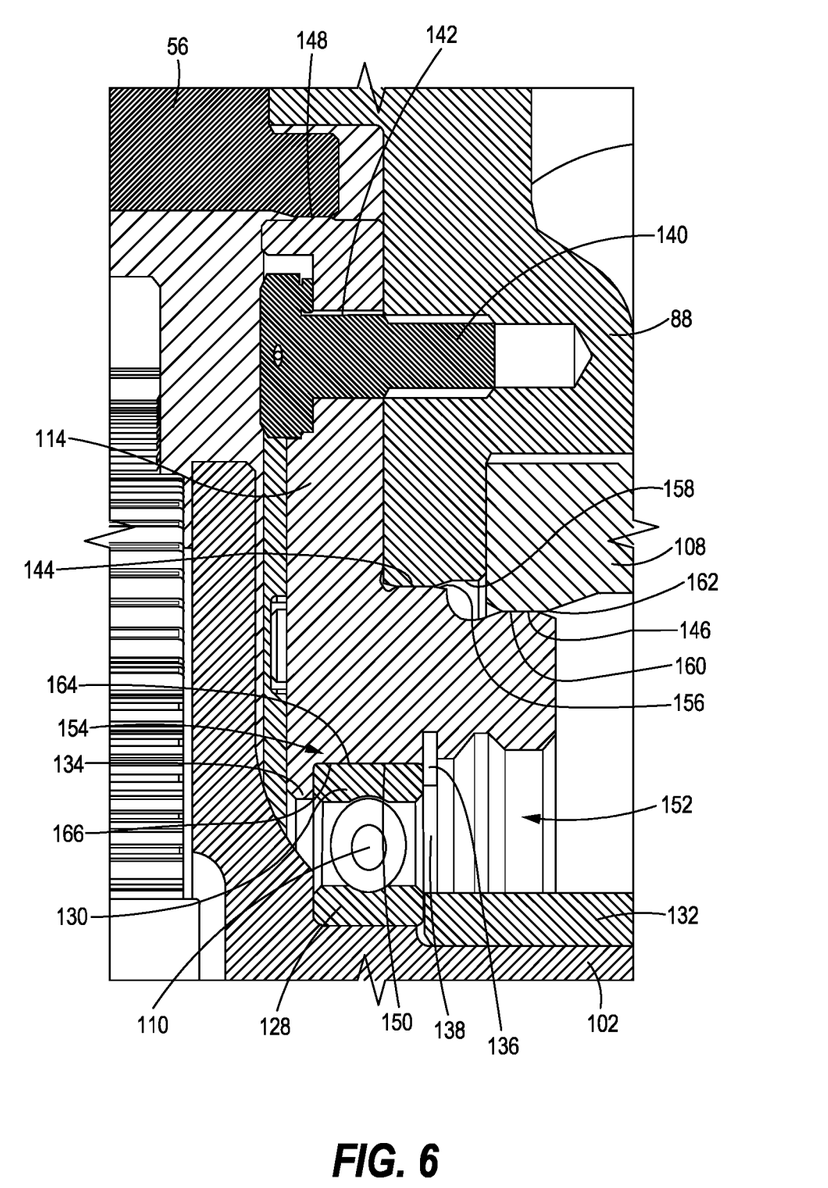
FIG. 6 is a sectional view of a portion of the turbocharger of FIG. 2, in accordance with an embodiment of the present disclosure.

In the illustrated embodiment, as shown in FIGS. 4-6 with continued reference to FIGS. 1-3, the gear train 90 may include a drive shaft 92 coupled, at a first end 94, to the turbine wheel 30. A sun gear 96 may be formed by or at a second end 98 of the drive shaft 92. A plurality of planet gears 100 may orbit, and mesh with, the sun gear 96. A planet carrier 102 may extend from center axes of the planet gears 100 and have formed thereon a spur gear 104. The spur gear 104 may, for example, drive one or more adjacent input gears 106. A gear support 108 may connect to the end wall 88 of the turbine housing 56, and may provide a means of supporting and providing oil to the planet carrier 102 and its associated rotating components.

The planet carrier 102 may be supported at one end by a primary bearing 110 that may be housed within a bore 112 of a bearing support 114, and at an opposing end by a secondary bearing 116 that may be pressed into a stepped bore 118 of the gear support 108. The secondary bearing 116 may include an inner race 120 and an outer race 122. Inner race 120 may engage the spur gear 104 on one end and a cap 124 on an opposite end. The cap 124 may engage an interior shoulder of the stepped bore 118 and support a lateral end of the planet carrier 102. The outer race 122 may be free on one end and the engage stepped bore 118 on an opposite end. A conduit 126 may extend through the cap 124 and direct oil toward bearings (not shown) associated with the planet gears 100.

Referring now to FIGS. 5 and 6, and with continued reference to FIGS. 1-4, the bearing support 114 may be utilized as a primary structural bulkhead and piloting device to align the numerous components of the gear train 90 and turbocharger 14. Specifically, bore 112 of the bearing support 114 may extending axially through a body 170 of the bearing support and may be dimensioned to house the primary bearing 110 of the epicyclic gear train 90. Similar to the secondary bearing 116, the primary bearing 110 may also include an inner race 128 and an outer race 130. The inner race 128 may engage the planet carrier 102 on one end, and a spacer 132, disposed around the planet carrier, on an opposite end. The outer race 130 may engage a shoulder 134 of the bearing support 114 on one end, and a snap ring 136 disposed within snap-ring groove 138 of the bearing support, on an opposite end.

The bearing support 114 may be fixedly installed to the end wall 88 using a bolt 140, for example, inserted from the compressor impeller 36 side of the turbocharger 14 through an aperture 142 in the bearing support. To ensure proper alignment of the bearing support 114 during installation, the bearing support may be machined directionally from the compressor impeller 36 side toward the turbine wheel 30 side (or, as typically called in the art, "from right to left"), and may also be constructed to form a plurality of pilots with surrounding components. For example, the bearing support 114 may include the bore 112 that may include a grooved portion 152 and a bearing portion 154. The grooved portion 152, for example, may include the snap-ring groove 138. A first pilot 144, therefore, may be formed between a radially exterior surface 156 of part of the bearing portion 154 of the bearing support 114 and a radially internal surface 158 of the end wall 88 of the turbine housing 56. A second pilot 146 may be formed between a radially exterior surface 160 of the grooved portion 152 of the bearing support 114 and a radially internal surface 162 of the gear support 108. The bearing portion 154 of the bearing support 114 may be dimensioned to accommodate the outer race 130 of the primary bearing 110, such that a third pilot 148 is formed between a radially internal surface 164 of the bearing portion of the bearing support and a radially external surface 166 of the outer race 130 of the primary bearing. Finally, a fourth pilot 150 may be formed between a radially external surface 168 of the bearing support 114 and a radially internal surface of the turbine housing 56. The plurality of pilots 144, 146, 148, 150 are configured to align the bearing support 114, the turbine housing 56, the end wall 88, the gear support 108, the primary bearing 110 and its associated inner 128 and outer 130 races, by way of interference fit at the locations of each of the pilots. In an alternative embodiment, however, one or more of the plurality of pilots 144, 146, 148, 150 may be configured to align the bearing support 114, the turbine housing 56, the end wall 88, the gear support 108, the primary bearing 110 and its associated inner 128 and outer 130 races, by way of a standard pilot fit or a transitional fit at the locations of each of the pilots

INDUSTRIAL APPLICABILITY

In practice, the teachings of the present disclosure may find applicability in many industries including, but not limited to, the railroad, marine, power generation, mining, construction, and farming industries, as well as other industries known in the art. More specifically, the present disclosure may be beneficial to locomotives, other vehicles, and any other machine utilizing a turbocharger.

Traditionally, doweling assemblies have been used to align complex housings and components of turbochargers utilizing drive trains. In that arrangement, the centers of the each component must first be aligned, holes then would be drilled through the components corresponding to locations of dowels, which were subsequently inserted. With the dowels installed, the components could be disassembled and then properly realigned during installation. The doweling method requires special tooling of each component, and accuracy is still incredibly difficult to achieve.

In contrast, the present bearing support 114 is a fully piloted assembly, relying on four critical pilots 144, 146, 148 and 150, which ultimately align each of the components in at least the turbine stage 68 of the turbocharger 14. More specifically, the bearing support 114, once interference fit within the turbocharger 14, aligns not only the primary bearing 110 and the secondary bearing 116, but all components of the epicyclic gear train 90 as well. The bearing support 114 is also machined for easy removal and replacement. For example, the turbocharger 14 may endure various stresses over its life span due to aerodynamic, thermal and mechanical loads. Occasionally, failures or problems may occur in the gear train 90 components. With traditional doweling arrangements, failures or damage within the turbocharger 14, or more specifically within the gear train 90, typically result in damage to the component at issue, but also all components surrounding the damaged component. As such, trying to repair damage to a doweled assembly of components is generally not feasible. In contrast, the fully piloted bearing support 114 relies on the pilots 144, 146, 148, 150 to align the bearing support within the turbocharger 14, as well as all the surrounding components, simply by inserting the bearing support into position.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A bearing support for a turbocharger, the bearing support comprising:
   a body fastened to an end wall of a turbine housing;
   a bore extending axially through the body and dimensioned to receive a bearing and a portion of a planet carrier; and
   a plurality of pilots, each pilot formed on an external surface of the body and each pilot machined for an interference fit with a different component of the turbocharger.

2. The bearing support of claim 1, wherein the turbocharger includes an epicyclic gear train, and the bearing support is installed within the epicyclic gear train.

3. The bearing support of claim 1, wherein the bore of the bearing support includes a plurality of annular grooves, at least one of the plurality of grooves dimensioned to accommodate a snap ring.

4. The bearing support of claim 1, wherein the plurality of pilots are machined in one set-up from the same side.

5. The bearing support of claim 1, wherein the plurality of pilots comprises a first pilot, a second pilot, a third pilot and a fourth pilot.

6. The bearing support of claim 5, wherein the first pilot is formed at a mating surface between a first radially exterior surface of the bearing support and a radially internal surface of an end wall of a housing of a turbine wheel.

7. The bearing support of claim 5, wherein the second pilot is formed at a mating surface between a second radially exterior surface of the bearing support and a radially internal surface of a gear support.

8. The bearing support of claim 5, wherein the third pilot is formed at a mating surface between a third radially internal surface of the bore of the bearing support and a radially external surface of an outer race of the bearing.

9. The bearing support of claim 5, wherein the fourth pilot is formed at a mating surface between a fourth radially exterior surface of the bearing support and a radially internal surface of a housing of a turbine wheel.

10. A gear train assembly for a turbocharger, the gear train assembly comprising:
    a drive shaft coupled to a turbine wheel and a sun gear;
    a plurality of planetary gears;
    a planet carrier extending from a center axis of the plurality of planetary gears through a primary bearing;
    a gear support coupled to a housing of the turbine wheel; and
    a bearing support, the bearing support comprising:
      a body;
      a bore extending axially through the body and dimensioned to receive the primary bearing and a portion of the planet carrier; and
      a plurality of pilots, each pilot formed on an external surface of the body and each pilot machined for interference fit with a different component of the turbocharger.

11. The gear train assembly of claim 10, wherein a spur gear is formed on the planet carrier, the spur gear configured to drive an input gear.

12. The gear train assembly of claim 10, wherein the gear support is coupled to an end wall of the housing of the turbine wheel.

13. The gear train assembly of claim 12, wherein the plurality of pilots includes a first pilot formed at a first radially exterior surface of the bearing support to engage a radially internal surface of the end wall.

14. The gear train assembly of claim 12, wherein the plurality of pilots includes a second pilot formed at a second radially exterior surface of the bearing support to engage a radially internal surface of the gear support.

15. The gear train assembly of claim 10, wherein the plurality of pilots includes a third pilot formed at a third radially internal surface of the bore of the bearing support to engage a radially external surface of an outer race of the primary bearing.

16. The gear train assembly of claim 10, wherein the plurality of pilots includes a fourth pilot formed at a fourth radially exterior surface of the bearing support to engage a radially internal surface of the housing of the turbine wheel.

17. A turbocharger, the turbocharger comprising:
    a turbine wheel housed in a turbine housing having an end wall;
    a compressor impeller housed in a compressor housing;
    a shaft extending between the turbine wheel and the compressor impeller, the turbine wheel and the compressor impeller being mounted on the shaft for rotation together; and
    a gear train driven by an engine, the gear train comprising:
      a drive shaft coupled to a turbine wheel;
      a plurality of planetary gears;
      a planet carrier configured to couple the plurality of planetary gears together; and
      a bearing support, the bearing support comprising:
        a body;
        a bore extending axially through the body and dimensioned to receive a portion of the planet carrier; and
        four pilots, each pilot configured to form an interference fit between an external surface of the bearing support and a surface of a corresponding component of the turbocharger.

18. The turbocharger of claim 17, wherein the gear train further comprises:
    a gear support coupled to the turbine housing;
    a primary bearing housed within the bore of the bearing support and dimensioned to surround a shaft of the planet carrier; and a secondary bearing press fit into a stepped bore of the gear support.

19. The turbocharger of claim 18, wherein a first pilot of the four pilots forms an interference fit with a radially internal surface of the end wall, a second pilot of the four pilots forms an interference fit with a radially internal surface of the gear support, a third pilot of the four pilots forms an interference fit with an outer race of the primary bearing, and a fourth pilot of the four pilots forms an interference fit with the turbine housing.

20. The turbocharger of claim 19, wherein installation of the bearing support within the gear train aligns the primary bearing, the secondary bearing, the gear support, the planet carrier, the drive shaft and the planetary gears.

* * * * *